US005720555A

United States Patent [19]
Elele

[11] Patent Number: 5,720,555
[45] Date of Patent: Feb. 24, 1998

[54] TEMPERATURE INDICATING CONTAINER AND LID APPARATUS

[76] Inventor: James N. Elele, 1026 E. Hampton St., Tucson, Ariz. 85719

[21] Appl. No.: 653,135

[22] Filed: May 24, 1996

[51] Int. Cl.$^6$ .................... G01K 13/12; G01K 13/00; G01K 1/14; G01K 1/02
[52] U.S. Cl. .................... 374/150; 374/162; 374/157; 374/160; 374/141; 116/216; 116/217; 220/703; 220/200; 206/459.1
[58] Field of Search ..................... 374/150, 162, 374/157, 159, 160, 161, 141; 116/218, 217, 216; 220/703, 200, 201; 206/459.1; 215/11.2, 387, 230; 229/400

[56] References Cited

U.S. PATENT DOCUMENTS

| D. 343,129 | 1/1994 | Farley | D10/46.2 |
|---|---|---|---|
| 2,866,338 | 12/1958 | Muncheryan | 374/150 |
| 3,382,840 | 5/1968 | Pabst | 116/218 |
| 3,546,942 | 12/1970 | Thiele | 374/150 |
| 3,651,695 | 3/1972 | Brown | 374/162 |
| 3,782,195 | 1/1974 | Meek et al. | 374/150 |
| 3,826,221 | 7/1974 | Ross | 116/216 |
| 3,864,976 | 2/1975 | Parker | 374/150 |
| 4,156,365 | 5/1979 | Heinmets et al. | 374/162 |
| 4,175,512 | 11/1979 | Iwanicki | 116/217 |
| 4,530,440 | 7/1985 | Leong | 220/201 |
| 4,538,926 | 9/1985 | Chretien | 374/162 |
| 4,805,188 | 2/1989 | Parker | 374/162 |
| 4,878,588 | 11/1989 | Ephraim | 374/150 |
| 4,919,983 | 4/1990 | Fremin | 374/150 |
| 4,933,525 | 6/1990 | St. Phillips | 374/161 |
| 5,176,275 | 1/1993 | Bowie | 220/201 |
| 5,315,956 | 5/1994 | Reno | 116/216 |
| 5,323,652 | 6/1994 | Parker | 73/295 |

*Primary Examiner*—Diego F. F. Gutierrez

[57] ABSTRACT

A temperature indicating container apparatus includes an inner container portion made from substantially heat insulative material. A thermochromic-substance-containing portion is juxtaposed against an outside surface of the inner container portion, such that color changes of the thermochromic-substance-containing portion can be seen from outside the inner container portion. The thermochromic-substance-containing portion may be in a form of a jacket around the outside surface of the inner container portion. The jacket may include a plurality of windows. An outermost container portion may be located outside both the thermochromic-substance-containing jacket and the inner container portion. The outermost container portion is light transmissive such that color changes of the thermochromic-substance-containing jacket can be seen from outside the outermost container portion. A bridge element bridges top portions of the inner container portion and the outermost container portion. The bridge element, a top portion of the inner container portion, and a top portion of the outermost container portion form a unified, liquid-tight seal. A lid assembly includes a lid portion for covering the inner container portion and the thermochromic-substance-containing portion. The lid portion may include thermochromic substances. The lid assembly may also include an orientation-changeable signal assembly that is connected to a top surface of the lid portion.

10 Claims, 3 Drawing Sheets

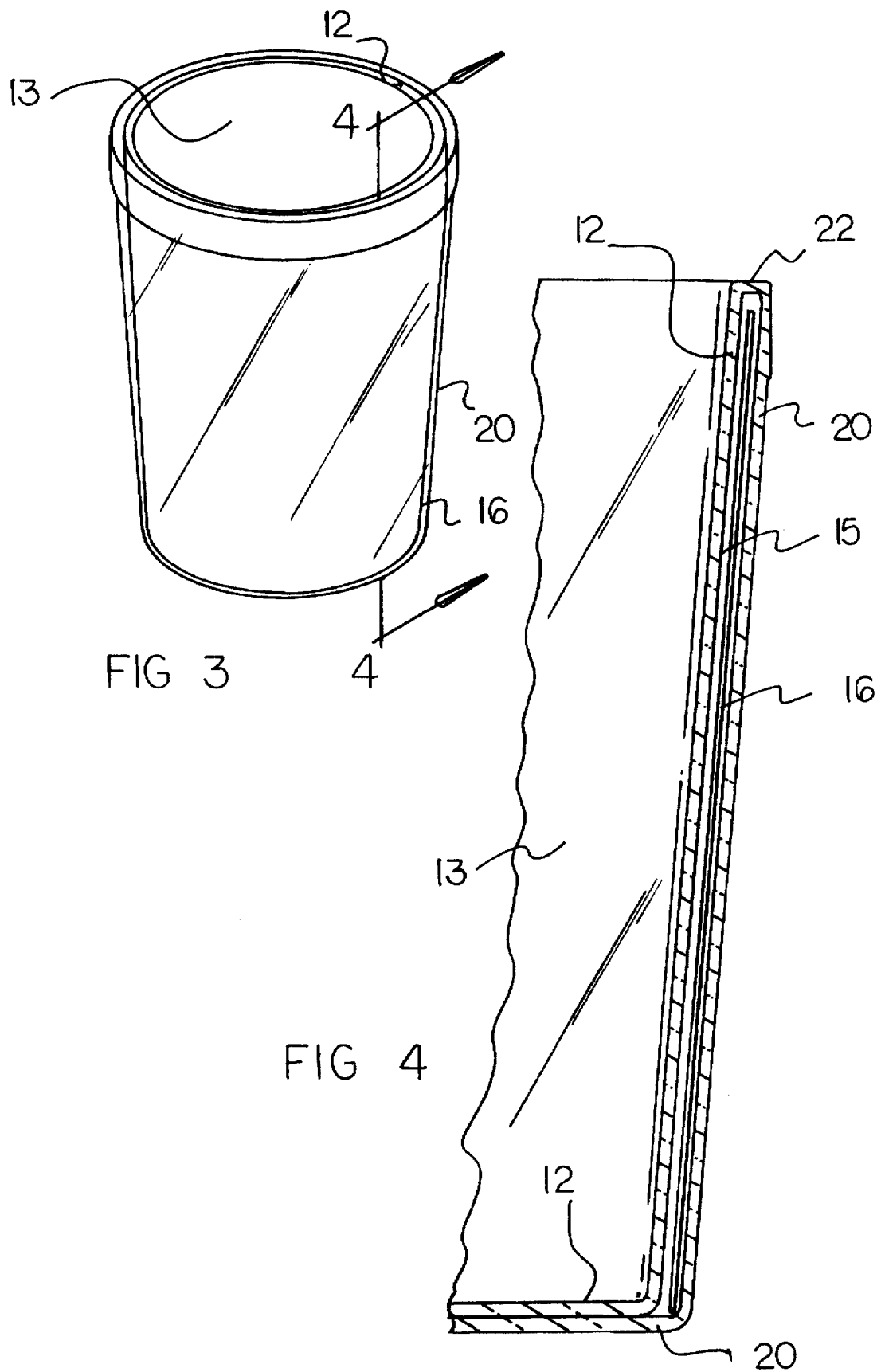

TEMPERATURE INDICATING CONTAINER AND LID APPARATUS

BACKGROUND OF THE INVENTION

1. Field of the Invention

The present invention relates generally to containers and, more particularly, to containers which include thermochromic substances which indicate the temperature of materials contained in the containers.

2. Description of the Prior Art

The use of thermochromic substances to indicate the temperature of materials contained in a container is an art that has developed throughout the years, providing a number of innovations, and the following U.S. Pat. Nos. are representative of some of those innovations: 4,919,983, 4,538,926, and 5,323,652. The thermochromic substances can signal when a contained material is either too hot or too cold for safe handling or consumption. Even though a material in a container may be too hot (or too cold) for consumption, it may still be desirable or necessary to pick up the container in one's hand. If the container is too hot (or too cold), a person's fingers may become burned. In this respect, it is noted that none of the containers in the above-cited patents discloses a container which has insulated portions for a person's fingers to grasp in picking up a container containing too-high or too-low temperature materials. Such insulated portions would prevent a person's fingers from becoming burned.

It is further noted that none of the above-cited patents provides a lid which includes a high temperature signal that moves its orientation on the lid when the material in the container is at a predetermined high temperature. In low light conditions, a lid having a signal that has a different orientation in high temperature conditions may be easier for a person to see that a color change of thermochromic substances. In this respect, it would be desirable if a container would include a lid that has a high temperature signal that has a different orientation when the material in the container is at or above a predetermined temperature.

U.S. Pat. No. 4,530,440 discloses a container lid that has temperature responsive, heat openable apertures that ventilate the contents of the container when a predetermined temperature of the heat openable apertures is reached. It is noted that when the vents are open, material inside the container can escape, and material in the environment outside the container can enter the container. Therefore, the material in the container can contaminate the environment, and the material in the environment can contaminate the contents of the container. To avoid such potential cross contamination, it would be desirable if a container lid were provided with a signal for high temperature conditions that does not permit cross contamination between the contents of the container and the environment.

U.S. Pat. No. 5,176,275 discloses a temperature release container that automatically ruptures when a predetermined temperature is achieved. Such a container permits cross contamination between the contents of the container and the environment.

U.S. Pat. No. Des. 343,129 may be of interest for its disclosure of a measuring cup that includes a mercury thermometer attached to the outside wall of the cup.

Thus, while the foregoing body of prior art indicates it to be well known to use thermochromic substances to indicate temperatures of the contents of containers, the prior art described above does not teach or suggest a temperature indicating container apparatus which has the following combination of desirable features: (1) discloses a container which has insulated portions for a person's fingers to grasp in picking up a container containing high temperature materials; (2) includes a lid which has a high temperature signal that changes orientation when the material in the container is above a predetermined temperature; and (3) provides a container lid which has a signal for high temperature conditions that does not permit cross contamination between the contents of the container and the environment. The foregoing desired characteristics are provided by the unique temperature indicating container apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a temperature indicating container apparatus which includes an inner container portion made from substantially heat insulative material. The inner container portion includes an inside, material-containing surface and an outside surface. A thermochromic-substance-containing portion is juxtaposed against the outside surface of the inner container portion, such that color changes of the thermochromic-substance-containing portion can be seen from outside the inner container portion. When reversible thermochromic substances are employed, the thermochromic-substance-containing portion undergoes one sequence of color changes when the thermochromic-substance-containing portion undergoes rising temperatures, and the thermochromic-substance-containing portion undergoes a reverse sequence of color changes when the thermochromic-substance-containing portion undergoes falling temperatures. The thermochromic-substance-containing portion may be in a form of a jacket around the outside surface of the inner container portion. The jacket may include a plurality of windows.

An outermost container portion is located outside both the thermochromic-substance-containing jacket and the inner container portion. The outermost container portion is light transmissive such that color changes of the thermochromic-substance-containing jacket can be seen from outside the outermost container portion. A bridge element bridges top portions of the inner container portion and the outermost container portion. The bridge element, a top portion of the inner container portion, and a top portion of the outermost container portion form a unified, liquid-tight seal.

A lid assembly includes a lid portion for coveting the inner container portion and the thermochromic-substance-containing portion. The lid portion may include thermochromic substances. The lid assembly may also include an orientation-changeable signal assembly that is connected to a top surface of the lid portion.

The orientation-changeable signal assembly may include thermochromic substances. The orientation-changeable signal assembly includes a sign assembly which includes a display portion and a resilient stem portion supporting the display portion. The resilient stem portion is attached to the top surface of the lid portion of the lid assembly, and a heat-softening adhesive portion is attached to the lid portion.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least three preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved temperature indicating container and lid apparatus which has all of the advantages of the prior art and none of the disadvantages.

It is another object of the present invention to provide a new and improved temperature indicating container and lid apparatus which may be easily and efficiently manufactured and marketed.

It is a further object of the present invention to provide a new and improved temperature indicating container and lid apparatus which is of durable and reliable construction.

An even further object of the present invention is to provide a new and improved temperature indicating container and lid apparatus which is susceptible of a low cost of manufacture with regard to both materials and labor, and which accordingly is then susceptible of low prices of sale to the consuming public, thereby making such temperature indicating container and lid apparatus available to the buying public.

Still yet a further object of the present invention is to provide a new and improved temperature indicating container apparatus which has insulated portions for a person's fingers to grasp in picking up a container containing high temperature materials.

Still another object of the present invention is to provide a new and improved temperature indicating container and lid apparatus that has a high temperature signal that changes orientation when the material in the container is above a predetermined temperature.

Yet another object of the present invention is to provide a new and improved temperature indicating container and lid apparatus which provides a container lid which has a signal for high temperature conditions that does not permit cross contamination between the contents of the container and the environment.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a perspective view showing a second embodiment of the temperature indicating container apparatus of the invention.

FIG. 4 is an enlarged cross-sectional view of the portion of the embodiment of the temperature indicating container apparatus shown in FIG. 3 taken along line 4—4 of FIG. 3.

DESCRIPTION OF THE PREFERRED EMBODIMENT

With reference to the drawings, a new and improved temperature indicating container and lid apparatus embodying the principles and concepts of the present invention will be described.

Figure 1:
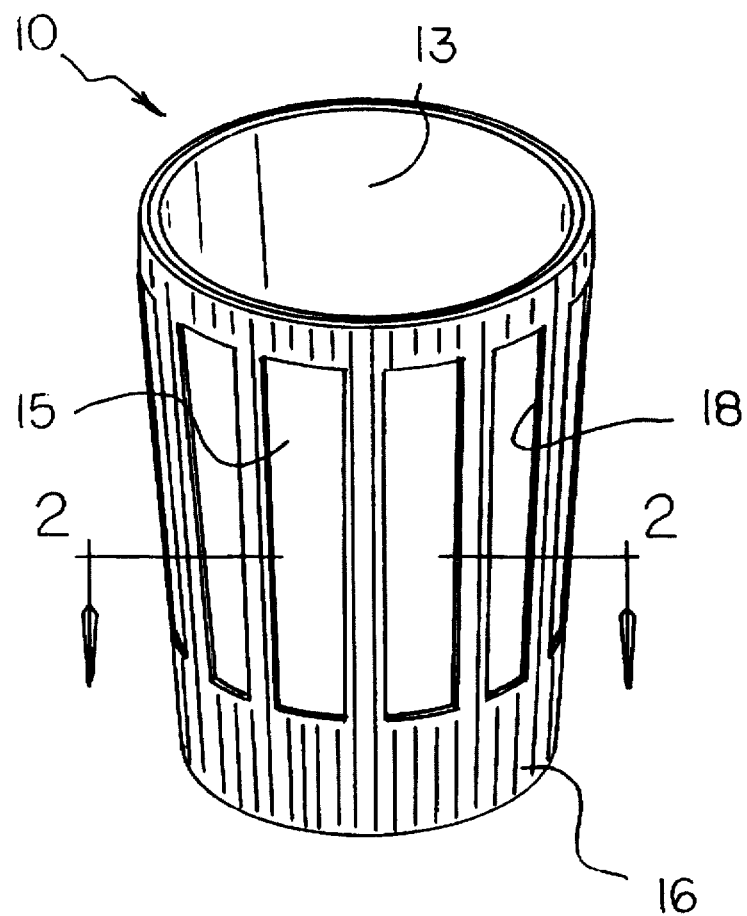
FIG. 1 is a perspective view showing a first embodiment of the temperature indicating container apparatus of the invention.
Figure 2:
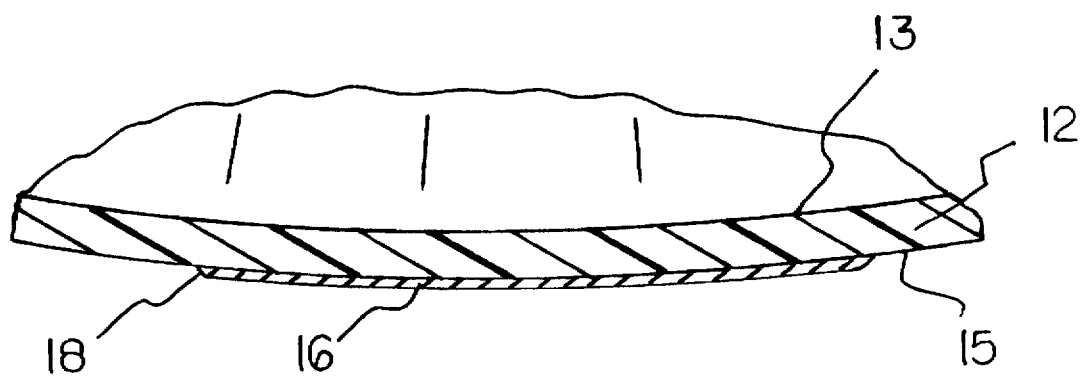
FIG. 2 is an enlarged cross-sectional view of the portion of the embodiment of the temperature indicating container apparatus shown in FIG. 1 taken along line 2—2 of FIG. 1.

Turning to FIGS. 1 and 2, there is shown a first embodiment of the temperature indicating container apparatus of the invention generally designated by reference numeral 10. In this embodiment, the temperature indicating container apparatus 10 includes an inner container portion 12 made from substantially heat insulative material. By the "heat insulative material" is meant a material which has a relatively low coefficient of conductivity so that a heated substance in the inner container portion will not so readily transfer heat as to cause discomfort or injury to the hands or fingers of a person holding the container as will be appreciated by those of ordinary skill in the art. Such heat insulative materials are well known and may comprise plastic, ceramic, wood, cardboard, or the like. The inner container portion 12 includes an inside, material-containing surface 13 and an outside surface 15. A thermochromic-substance-containing portion is juxtaposed against the outside surface 15 of the inner container portion 12, such that color changes of the thermochromic-substance-containing portion can be seen. The thermochromic-substance-containing portion undergoes one sequence of color changes thermochromic-substance-containing portion undergoes rising temperatures, and the thermochromic-substance-containing portion undergoes a reverse sequence of color changes when the thermochromic-substance-containing portion undergoes falling temperatures. Such reversible thermochromic-substance-containing portions are especially useful for reusable containers. However, for disposable containers, the thermochromic-substance-containing portion need not undergo reversible color changes.

As shown in FIGS. 1–4, the thermochromic-substance-containing portion is in a form of a jacket 16 around the outside surface 15 of the inner container portion 12. The jacket 16 includes a plurality of windows 18. Aside from using windows 18, a wide variety of designs can be used for the thermochromic-substance-containing portion. For example, suitable design patterns includes stripes, circles, stars, flower shapes, etc. A preferred color change is from blue to red for hot materials and from gray to deep blue for cold materials.

The thermochromic-substance-containing portion can be attached to the inner container portion 12 in a number of ways which include using adhesives or using processes which include encapsulation, electrodeposition, reactive sputtering, or ion beam sputtering.

Turning to FIGS. 3 and 4, a second embodiment of the invention is shown. Reference numerals are shown that correspond to like reference numerals that designate like elements shown in the other figures. In addition, an outermost container portion 20 is located outside both the thermochromic-substance-containing jacket 16 and the inner container portion 12. The outermost container portion 20 is light transmissive such that color changes of the thermochromic-substance-containing jacket 16 can be seen. A bridge element 22 bridges top portions of the inner container portion 12 and the outermost container portion 20. The bridge element 22, a top portion of the inner container portion 12, and a top portion of the outermost container portion 20 form a unified, liquid-fight seal.

In using the first and second embodiments of the invention, when a material, such as a beverage liquid, is poured into the inner container portion 12, the thermochromic-substance-containing portion changes color in response to the temperature of the beverage liquid. The thermochromic-substance-containing portion can be calibrated so that specific colors can be indicative of specific temperatures. Thermochromic substances that are used in the thermochromic-substance-containing portion can be similar to or the same as the thermochromic substances disclosed in U.S. Pat. Nos. 4,919,983, 4,538,926, and 5,323, 652, mentioned above and incorporated herein by reference.

More specifically, the thermochromic substances can be selected from the group consisting of polydiacetylenic phospholipids (which change color from dark blue orange above 50 degrees Celsius), diacetylene polymer in a polyethylene matrix (which changes from blue to red at about 16 degrees Celsius), a gel of isotactic polypropylene in 3% solution (which changes color from blue to violet, red, and yellow as temperature increases), and metallic thermochromes. Examples of metallic thermochromes include $CoCl_2.6H_2O$ in isopropyl alcohol-water solution (used to measure temperature between 5 degrees Celsius and 75 degrees Celsius), crystal violet lactone (which when coated on paper, changes from ultramarine below 10 degrees Celsius to transparent above 28 degrees Celsius), and metal oxides such as vanadium-bismuth-alkaline earth compounds.

Other suitable thermochromic substances include so-called "Liquid Crystal Inks" available from Edmund Scientific Company, Barrington, N.J. More specifically, liquid crystal ink ES#72370 is for temperatures between 40–45 degrees Celsius; liquid crystal ink ES#72371 is for temperatures between 35–40 degrees Celsius; and liquid crystal ink ES#72375 is for temperatures between 20–25degrees Celsius.

Figure 5:
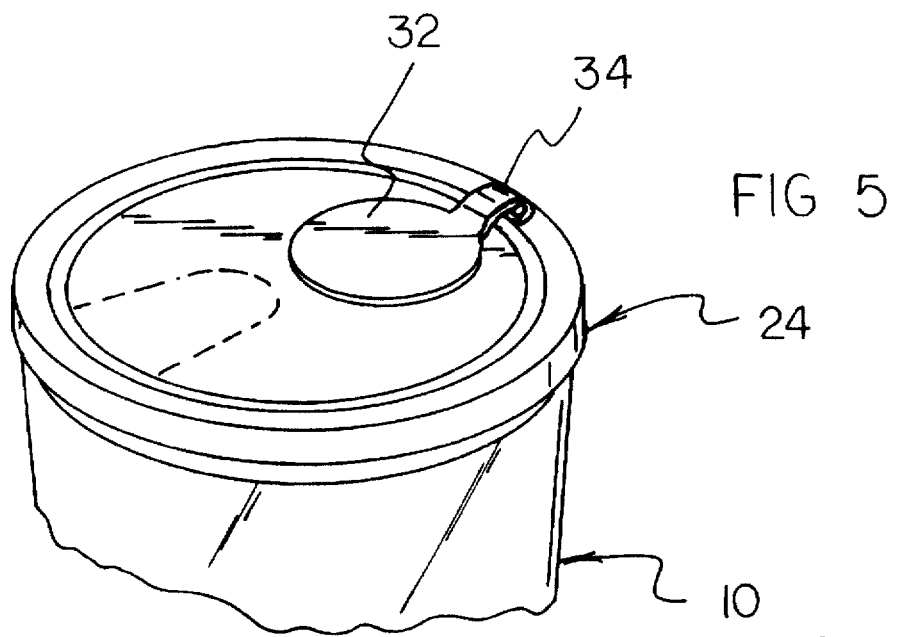
FIG. 5 is a perspective view showing a third embodiment of the temperature indicating container apparatus of the invention which includes a lid having a high temperature orientable signal in a relatively low temperature orientation.
Figure 6:
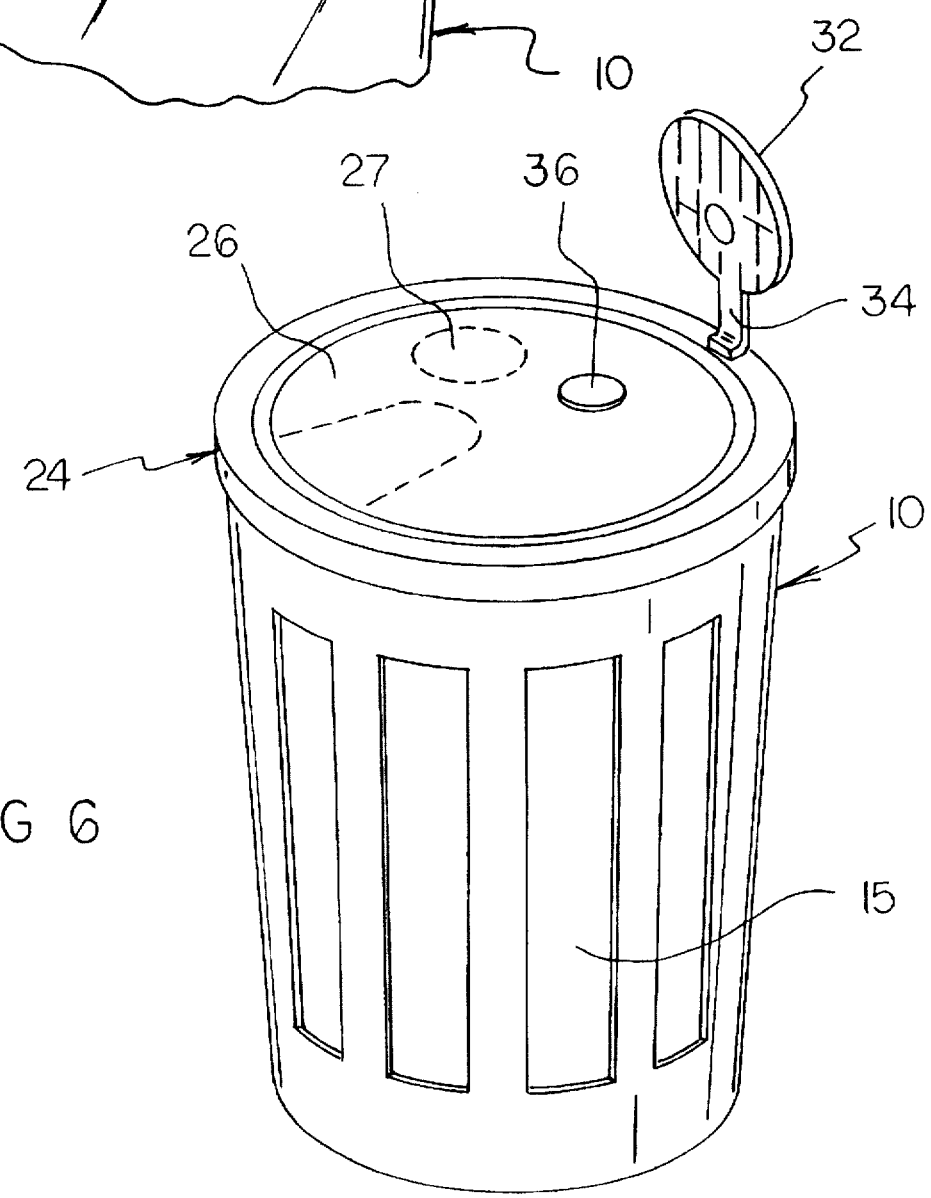
FIG. 6 is a perspective view showing the embodiment of the invention shown in FIG. 5 having the high temperature orientable signal in a relatively high temperature orientation.

Turning to FIGS. 5 and 6, a third embodiment of the invention is shown. Reference numerals are shown that correspond to like reference numerals that designate like elements shown in the other figures. In addition, a lid assembly 24 includes a lid portion 26 for covering the inner container portion 12 and the thermochromic-substance-containing portion. The lid portion may include thermochromic substances 27. The lid assembly 24 may also include an orientation-changeable signal assembly that is connected to a top surface of the lid portion.

The orientation-changeable signal assembly may include thermochromic substances. The orientation-changeable signal assembly includes a sign assembly which includes a display portion 32 and a resilient stem portion 34 supporting the display portion 32. The resilient stem portion 34 is attached to the top surface of the lid portion of the lid assembly 24, and a heat-softening adhesive portion 36 attached to the lid portion.

In using the third embodiment of the invention, as long as the heat-softening adhesive portion 36 has not softened sufficiently, the display portion 32 of the sign assembly is held down by the heat-softening adhesive portion 36, overcoming the lifting force of the resilient stem portion 34. However, when the heat-softening adhesive portion 36 softens sufficiently, the spring bias force exerted by the resilient stem portion 34 overcomes the adhesive force of the heat-softening adhesive portion 36, and the resilient stem portion 34 flips up or pops up the display portion 32.

Thus, as described above, the lid portion can include thermochromic substances, the orientation-changeable signal assembly can include thermochromic substances, or both can include thermochromic substances. If desired, the lid portion can be formed with a thermochromic-substance-containing portion sandwiched between a lower and an upper lid portion.

As another alternative, the orientation-changeable signal assembly can dispense with the heat-softening adhesive portion 36 when the resilient stem portion 34 of the sign assembly is made from a type of plastic which has a first memory orientation under relatively cool temperature conditions and has a second memory orientation under relatively warm temperature conditions. With such a material, the display portion 32 would lay flat trader cool temperature conditions, and the display portion 32 would flip up or pop up by is lifted by the resilient stem portion 34 under warm temperature conditions. The display portion 32 of the sign assembly can provide a wide variety of visual signals. For example, words such as "hot" or "cold" can appear as specific colors. More detailed messages can also be spelled out.

The containers of the invention can take on a variety of shapes and sizes. For example, the container can be in the form of a soup bowl, a coffee cup, a plastic container, such as styrofoam, or a paper cup. The principles of the invention can also be used in providing a handle for a pot that changes colors when the temperature of the handle changes.

The components of the temperature indicating container and lid apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved temperature indicating container apparatus that is low in cost, relatively simple in design and operation, and which has insulated portions for a person's fingers to grasp in picking up a container containing high temperature materials. Also, with the invention, a temperature indicating container and lid apparatus is provided which has a high temperature signal that changes orientation when the material in the container is above a predetermined temperature. With the invention, a temperature indicating container and lid apparatus provides a container lid which has a signal for high temperature conditions that does not permit cross contamination between the contents of the container and the environment.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A temperature indicating container apparatus, comprising:

an inner container portion made from substantially heat insulative material, wherein said inner container portion includes an inside, material-containing surface and an outside surface, a thermochromic-substance-containing portion juxtaposed against said outside surface of said inner container portion, such that color changes of said thermochromic-substance-containing portion can be seen;

a lid assembly which includes:

a lid portion for covering said inner container portion and said thermochromic-substance-containing portion, wherein said lid assembly further includes a heat-responsive orientation-changeable signal assembly connected to a top surface of said lid portion.

2. The apparatus of claim 1 wherein said orientation-changeable signal assembly includes thermochromic substances.

3. The apparatus of claim 1 wherein said orientation-changeable signal assembly includes:

a sign assembly which includes a display portion and a resilient stem portion supporting said display portion, wherein said resilient stem portion is attached to said top surface of said lid portion of said lid assembly, and a heat-softening adhesive portion attached to said lid portion.

4. The apparatus of claim 1 wherein said thermochromic-substance-containing portion undergoes one sequence of color changes when said thermochromic-substance-containing portion undergoes rising temperatures, and said thermochromic-substance-containing portion undergoes a reverse sequence of color changes when said thermochromic-substance-containing portion undergoes falling temperatures.

5. The apparatus of claim 1 wherein said thermochromic-substance-containing portion is in a form of a jacket around said outside surface of said inner container portion.

6. The apparatus of claim 5 wherein said jacket includes a plurality of windows.

7. The apparatus of claim 5, further including:

an outermost container portion located outside of said thermochromic-substance-containing jacket and said inner container portion, wherein said outermost container portion is light transmissive such that color changes of said thermochromic-substance-containing jacket can be seen.

8. The apparatus of claim 7, further including:

a bridge element which bridges top portions of said inner container portion and said outermost container portion.

9. The apparatus of claim 8 wherein said bridge element, a top portion of said inner container portion, and a top portion of said outermost container portion form a unified, liquid-tight seal.

10. The apparatus of claim 1 wherein said lid portion includes thermochromic substances.

* * * * *